(12) United States Patent
Burgess et al.

(10) Patent No.: US 8,750,177 B2
(45) Date of Patent: Jun. 10, 2014

(54) ALLOCATING MEMORY TO LOW USAGE PACKET DATA SESSIONS IN A WIRELESS COMMUNICATION SYSTEM

(75) Inventors: John K. Burgess, Morris Township, NJ (US); Ken Del Signore, North Aurora, IL (US); David Vollman, Naperville, IL (US); David Welch, Sugar Grove, IL (US)

(73) Assignee: Alcatel Lucent, Paris (FR)

( * ) Notice: Subject to any disclaimer, the term of this patent is extended or adjusted under 35 U.S.C. 154(b) by 1077 days.

(21) Appl. No.: 11/618,105

(22) Filed: Dec. 29, 2006

(65) Prior Publication Data

US 2008/0161004 A1 Jul. 3, 2008

(51) Int. Cl.
*H04L 12/28* (2006.01)
*H04Q 11/00* (2006.01)
*G06F 15/167* (2006.01)

(52) U.S. Cl.
USPC ............ 370/310; 370/401; 370/428; 709/212

(58) Field of Classification Search
USPC .................. 370/310, 331, 349, 401; 455/445, 455/436–444; 379/58; 709/212
See application file for complete search history.

(56) References Cited

U.S. PATENT DOCUMENTS

| | | | | |
|---|---|---|---|---|
| 5,799,256 | A * | 8/1998 | Pombo et al. ................. | 455/574 |
| 6,253,207 | B1 * | 6/2001 | Malek et al. .......................... | 1/1 |
| 6,775,291 | B1 * | 8/2004 | Ryu et al. ...................... | 370/401 |
| 7,984,073 | B1 * | 7/2011 | Basiago et al. ............... | 707/802 |
| 2002/0069322 | A1 * | 6/2002 | Galbraith et al. ............. | 711/113 |
| 2004/0003056 | A1 * | 1/2004 | Yamaguchi et al. .......... | 709/219 |
| 2004/0168052 | A1 * | 8/2004 | Clisham et al. ............... | 713/153 |
| 2004/0192355 | A1 * | 9/2004 | Nowlan ........................ | 455/466 |
| 2005/0015601 | A1 * | 1/2005 | Tabi .............................. | 713/182 |
| 2006/0056351 | A1 * | 3/2006 | Wall .............................. | 370/331 |
| 2006/0059205 | A1 * | 3/2006 | Shah et al. .................... | 707/200 |
| 2006/0136377 | A1 * | 6/2006 | Patt-Shamir et al. ............ | 707/3 |
| 2007/0094343 | A1 * | 4/2007 | Sangle et al. ................. | 709/207 |
| 2007/0097272 | A1 * | 5/2007 | Moradi et al. ................ | 348/731 |
| 2007/0171870 | A1 * | 7/2007 | Oba et al. ..................... | 370/331 |

* cited by examiner

*Primary Examiner* — Nizar Sivji (57) ABSTRACT

The present invention provides a method involving at least one mobile unit having at least one first session with a base station router. The method includes determining at least one activity level associated with said at least one first session and allocating memory to the at least one first session based on the at least one determined activity level.

25 Claims, 4 Drawing Sheets

| | | | |
|---|---|---|---|
| | TIME = 10:26:10 | 205 | |
| 110(4) | 10:25:59 | ACTIVE | 200 |
| ⋮ | ⋮ | ⋮ | |
| 110(3) | 00:09:30 | COMPRESS | |
| ⋮ | ⋮ | ⋮ | |
| 110(2) | 00:05:30 | PARK | |
| ⋮ | ⋮ | ⋮ | |
| 110(1) | NEVER | VACATE | |

Figure 1

| TIME = 10:26:10 | | | | | | | | |
|---|---|---|---|---|---|---|---|---|
| 110(4) | 10:25:59 | ACTIVE | ... | ... | ... | | | |
| ... | ... | ... | | | | | | |
| 110(3) | 00:09:30 | COMPRESS | | | | | | |
| ... | ... | ... | | | | | | |
| 110(2) | 00:05:30 | PARK | | | | | | |
| ... | ... | ... | | | | | | |
| 110(1) | NEVER | VACATE | | | | | | |

| 110(1) | 110(7) | ... | 110(n) |
|---|---|---|---|

ALLOCATING MEMORY TO LOW USAGE PACKET DATA SESSIONS IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

In conventional wireless communications, one or more mobile units (or access terminals) may establish a wireless link to a Radio Access Network (RAN). The RAN architecture is typically hierarchical and call state information associated with each mobile unit's session is stored in a central repository, such as a Radio Network Controller (RNC), a Packet Data Serving Node (PDSN), and the like. One alternative to the conventional hierarchical network architecture is a distributed architecture including a network of base station routers. For example, each base station router may combine RNC and/or PDSN functions in a single entity that manages radio links between one or more mobile units and an outside network, such as the Internet. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

Distributed architectures allow one or more mobile units to establish a session with any one of the plurality of base station routers. To establish a session, the base station router negotiates session parameters with the mobile unit and assigns an identifier, such as a Unicast Access Terminal Identifier (UATI), to the mobile unit. For example, a proposed Code Division Multiple Access (CDMA) protocol standard for packet data transmission, sometimes referred to as the EVolution-Data Only (EVDO) standard, specifies a unique 128-bit UATI that is assigned to a mobile unit when a session is initiated by the mobile unit. The mobile unit maintains the UATI for the duration of the session. In the current implementation, the EVDO session UATI is divided into two parts: a 104-bit UATI104 and a 24-bit UATI024. The UATI024 portion is unique to the mobile unit for the duration of the session and the UATI104 is common to all mobile units within a predetermined subnet of base station routers in the distributed network. During negotiation and granting of the session, the base station router allocates resources, such as system memory, to the mobile unit. Negotiation of the session parameters and allocation of the resources to the session consume processor bandwidth in the base station router and other entities in a wireless communication system.

In operation, base station routers in a conventional distributed network may broadcast, or advertise, their subnet address, e.g. the address indicated by the UATI104 portion of the UATI. However, the address is generally too long for mobile units to insert in the user identification portion of each message sent to the base station routers, so the base station routers also typically advertise a color code for use by the mobile station, which is typically an 8-bit representation of (or alias to) the 104-bit UATI104 subnet address. The base station router providing service to the mobile unit may change, e.g., due to fluctuating channel conditions and/or when the mobile unit roams between different subnets in the distributed network. Accordingly, mobile units may determine whether or not the subnet including the base station router providing service to the mobile unit has changed by monitoring the advertised subnet address on the control channel. Mobile units may request a session transfer between subnets based on the detected changes in the color codes.

Additional system resources may be consumed when a mobile unit and the associated session are transferred between subnets. For example, mobile units typically request a session transfer from the old subnet to the new subnet when the mobile unit detects a change in the subnet address broadcast by nearby base station routers. For example, a mobile unit may initiate a session with a first base station router belonging to a first subnet having a first subnet address. The first base station router assigns a UATI to the mobile unit. When the mobile unit becomes associated with a second base station router belonging to a second subnet having a second subnet address, the mobile unit may request, using the associated color code, that its previous session information be transferred from the first base station router to the second base station router. The memory allocated to the mobile unit may also be transferred to the second base station router. All of these processes consume processor bandwidth at both the source and target locations.

In order to utilize services provided by a wireless communication system, the mobile unit associated with a session must request and establish a connection. For example, a mobile with an existing session may transmit a request for service to the wireless communication system and the system may establish a connection in response to the request. Establishing the connection typically includes negotiating various parameters according to one or more protocols, such as the Point-to-Point Protocol (PPP), between the mobile unit and a wireless communication system. Once the session and the connection have been established, the mobile unit can exchange packets with the wireless communication system. For example, a mobile unit and the system may exchange Internet Protocol (IP) datagrams with hosts in the Internet when both a session and a connection have been established.

Mobile units that have established sessions with the wireless communication system do not necessarily utilize the available services and therefore do not necessarily establish connections associated with these sessions. To the contrary, the vast majority of mobile units that establish a session with the current 1×EVDO system rarely or never establish a connection to the system. For example, only 3% to 10% of the mobile units having sessions with currently deployed EVDO systems are believed to ever establish a connection to access the services provided by the systems. An even smaller percentage of the mobile units are believed to be frequent users that maintain a connection for a large percentage of the lifetime of the associated session. Consequently, a significant quantity of system resources may be allocated to sessions that rarely or never have any need of these resources, which may deprive other users of system resources, particularly when the system is heavily loaded.

Previous proposals to reduce processing and memory usage/paging have taken the form of software optimization techniques, such as time-consuming "memory mining" activities that may become more efficient with memory use. Additional functionality may also be added to reduce the number of idle transfers, features such as RNC Grouping, or increasing the size of subnet areas. This latter feature reduces the number of idle transfers at a cost of increasing the paging load, which requires another feature to reduce the paging area. This feature, however, has an additional side effect that mobile units may send route update messages more often, and the information from the route update message will have to be stored with the session information, using memory and processing. None of these techniques directly address the problem of users that rarely use the system.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided involving at least one mobile unit having at least one first session with a base station router. The method includes determining at least one activity level associated with said at least one first session and allocating memory to the at least one first session based on the at least one determined activity level.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
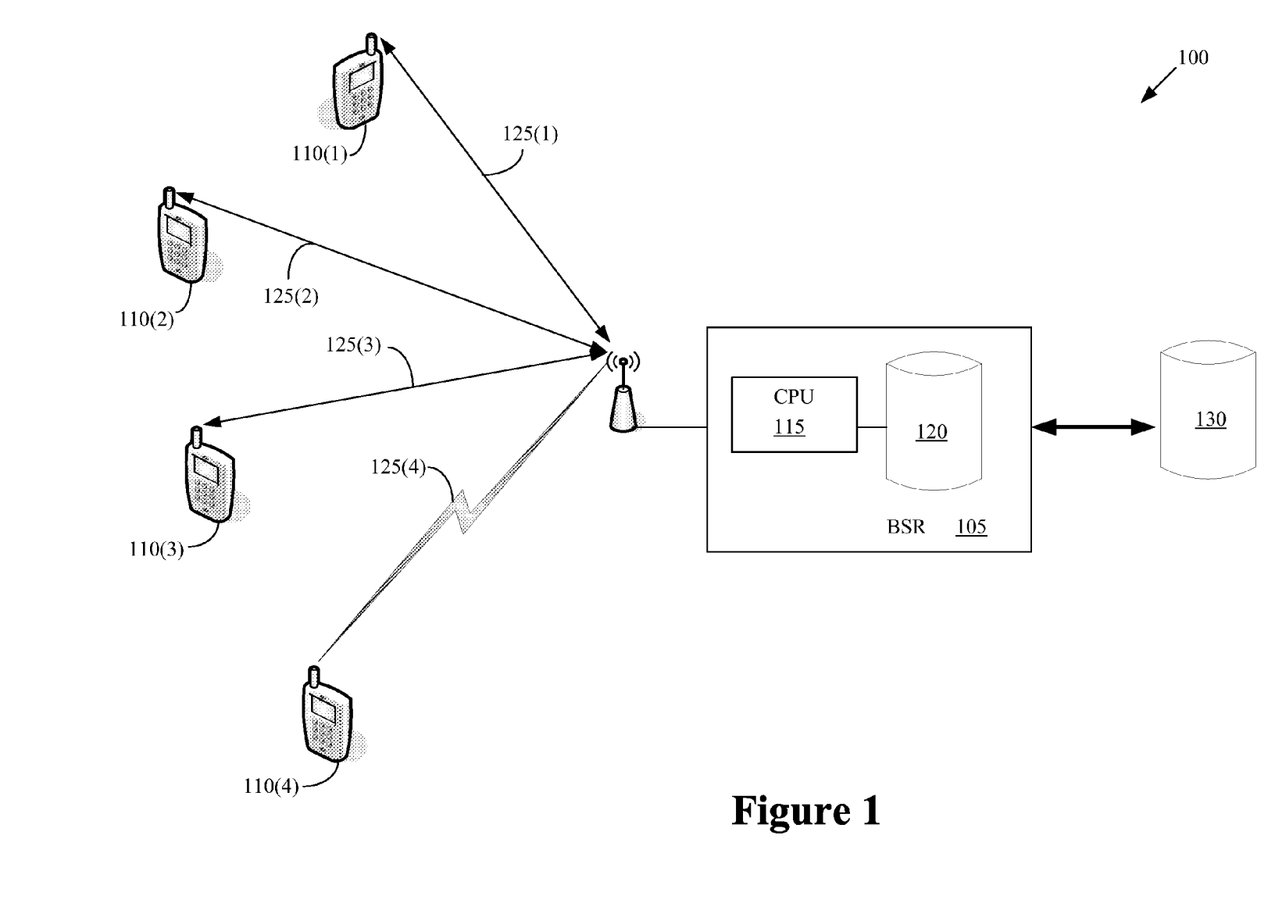
FIG. 1 conceptually illustrates a first exemplary embodiment of a distributed wireless communication system, in accordance with the present invention.

FIG. 1 conceptually illustrates a first exemplary embodiment of a distributed wireless communication system 100. In the first exemplary embodiment, access points for the distributed wireless communication system 100 include a distributed network of base station routers 105 (only one shown in FIG. 1). Although the present invention will be described in the context of the distributed wireless communication system 100 comprising one or more base station routers 105, persons of ordinary skill in the art should appreciate that the present invention is not limited to distributed wireless communication systems 100 in which the access points are base station routers 105. In alternative embodiments, the distributed wireless communication system 100 may include any desirable number and/or type of access point.

The wireless communication system 100 provides wireless connectivity to one or more mobile units 110(1-4). Hereinafter, in the interest of clarity, the mobile units 110(1-4) will be referred to collectively by the index 110 unless the description is referring to a specific mobile unit, such as the mobile unit 110(1), or a subset of the mobile units 110, such as the mobile units 110(1-2). This invention may also be applied to other elements that are indicated by a common numeral and one or more distinguishing indices. In the illustrated embodiment, the wireless communication system 100 provides wireless connectivity to the mobile units 110 according to the Code Division Multiple Access (CDMA) protocol standard for packet data transmission, sometimes referred to as the EVolution-Data Only (EVDO) standard. However, persons of ordinary skill in the art having benefit of the present disclosure should appreciate that the present invention is not limited to this CDMA protocol. In alternative embodiments, other protocols may be used in place of or in combination with the CDMA protocol.

The base station router 105 is capable of initiating, establishing, maintaining, transmitting, receiving, terminating, or performing other actions related to a session with one or more of the mobile units 110. For example, each base station router 105 may combine Radio Network Controller (RNC) and Packet Data Serving Node (PDSN) functions in a single entity. The base station routers 105 may also be configured to communicate with other base station routers 105, other devices, other networks, and the like. In the illustrated embodiment, processing tasks performed by the base station router 105 are carried out by a central processing unit (CPU) 115 implemented in the base station router. The base station router 105 also includes resident memory 120 that may be used to store software used to implement various tasks carried out by the base station router 105, as well as information associated with operation of the base station router 105. The resident memory 120 is configured to permit relatively fast access to information stored thereon, at least in part to reduce delays associated with initiating, establishing, maintaining, transmitting, receiving, terminating, or performing other actions related to a session with one or more of the mobile units 110.

The base station router 105 is also configured to create, assign, transmit, receive, and/or store information related to the sessions established between the base station routers 105 and the one or more mobile units 110. This information will be collectively referred to hereinafter as session state information, in accordance with common usage in the art. For example, the session state information may include information related to an air interface protocol, one or more sequence numbers, a re-sequencing buffer, and the like. The session state information may also include information related to a Point-to-Point Protocol (PPP), such as header compression information, payload compression information, and related parameters. Session state information related to other protocol layers may also be created, transmitted, received, and/or stored by the base station routers 105. In one embodiment, the session state information includes a session identifier, such as a Unicast Access Terminal Identifier (UATI). The session state information may be stored in the resident memory 120.

When the mobile unit 110 initiates a session with the base station router 105, the central processing unit 115 allocates memory in the resident memory 120 for session state information and other information associated with the mobile unit 110 and/or the session. In the illustrated embodiment, all of the mobile units 110 have established a session 125 with the base station router 105. Mobile units 110 that have sessions 125 with a base station router 105 may also initiate a connection associated with a session 125. For example, the mobile units 110 may initiate a connection and negotiate the PPP parameters that are used for communication over the connection. However, in the illustrated embodiment, only the mobile unit 110(4) has formed an active connection (indicated by the lightning bolt) associated with the session 125(4). Accordingly, only the mobile unit 110(4) may be accessing services provided by the base station router 105, such as services associated with the 1xEVDO system. The mobile unit 110(4) may therefore be classed or categorized as an active mobile unit.

The mobile units 110(1-3) that do not have an active connection may also be associated with an activity level. In the illustrated embodiment, the mobile unit 110(2) has recently established a connection using the session 125(2). The connection may have been used to utilize services provided by the 1xEVDO network. The mobile unit 110(2) may also have established one or more connections associated with a previous session to the base station router 105. Thus, the mobile unit 110(2) may be categorized as a less active mobile unit than, e.g., the mobile unit 110(4). The mobile unit 110(2) may therefore be associated with an activity class that may be referred to as "Park," for reasons that will be discussed below. In the illustrated embodiment, the mobile unit 110(2) does not have an active connection.

In the illustrated embodiment, the mobile unit 110(3) has recently established a connection using the session 125(3). The connection may have been used to utilize services provided by the 1xEVDO network. The mobile unit 110(2) may also have established one or more connections associated with a previous session to the base station router 105. Thus, the mobile unit 110(2) may be categorized as a less active mobile unit than, e.g., the mobile unit 110(4). However, the mobile unit 110(3) may be more active than the mobile unit 110(2). The mobile unit 110(3) may therefore be associated with an activity class that may be referred to as "Compress," for reasons that will be discussed below. In the illustrated embodiment, the mobile unit 110(3) does not have an active connection.

Furthermore, in the illustrated embodiment, the mobile unit 110(1) may never have established a connection using the session 125(1) or any previous sessions. Thus, the mobile unit 110(1) may be categorized as an inactive mobile unit. The mobile unit 110(1) may therefore be associated with an activity class that may be referred to as "Vacate," for reasons that will be discussed below. Information indicating the activity levels of the mobile units 110 may be stored in a database, e.g., in the resident memory 120. In one alternative embodiment, triggers other than the activity level may also be used to vacate a session. For example, a session associated with a mobile unit 110 may be vacated if the mobile unit 110 fails to correctly authenticate itself, or if the mobile unit 110 is a disallowed and/or invalid mobile unit 110 within the system 100. Furthermore, in some embodiments, the system load may be evaluated before initiating any procedures to park or vacate sessions. For example, if the system load is relatively low then it may not be necessary to park, compress, or vacate any sessions because the usage level of the system resources is relatively low.

Figure 2A:
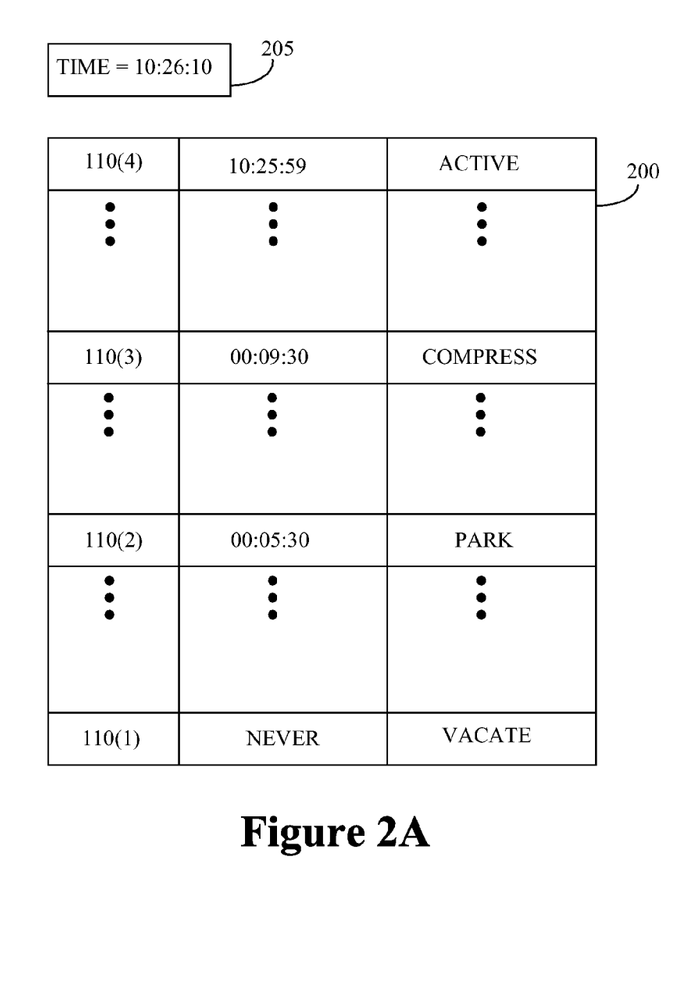
FIG. 2A conceptually illustrates one exemplary embodiment of a database indicating activity classes of mobile units, in accordance with the present invention.

FIG. 2A conceptually illustrates one exemplary embodiment of a database 200 indicating activity classes of mobile units. The illustrated embodiment of the database 200 includes columns for an identifier associated with each mobile unit, a timestamp indicating the last time the mobile unit used an active connection, and an activity class or level associated with the mobile unit. For example, the mobile unit 110(4) has a timestamp that indicates that the mobile unit 110(4) used an active connection at 10:25:59. A clock 205 indicates that the current time is 10:26:10 and so the mobile unit 110(4) is classified as ACTIVE, as indicated in the activity level column in the database 200. For another example, the mobile unit 110(3) has a timestamp that indicates that the mobile unit 110(3) last used an active connection at 00:09:30 and so the mobile unit 110(3) is classified as COMPRESS, as indicated in the activity level column in the database 200. For yet another example, the mobile unit 110(2) has a timestamp that indicates that the mobile unit 110(2) last used an active connection at 00:05:30 and so the mobile unit 110(2) is classified as PARK, as indicated in the activity level column in the database 200. For still another example, the mobile unit 110(1) has a timestamp that indicates that the mobile unit 110(2) never used an active connection and so the mobile unit 110(1) is classified as VACATE, as indicated in the activity level column in the database 200.

Figure 2B:
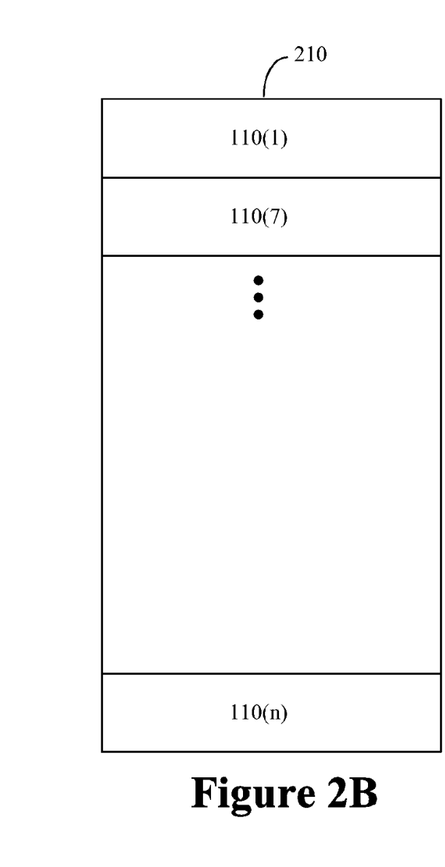
FIG. 2B conceptually illustrates one exemplary embodiment of a database indicating mobile units that have been classified as inactive, in accordance with the present invention.

In the illustrated embodiment, the position of the mobile units 110 in the database 200 is determined based upon the associated activity level. For example, mobile units 110 may be sorted according to their activity level so that the most active mobile units 110 are given positions at the top of the database 200 and the least active mobile units 110 are assigned to positions near the bottom of the database 200. However, other techniques may be used for sorting the database 200. For example, the database 200 may be sorted based upon frequency of activity, time since last activity, or some other criteria or combination of criteria. Sorting the mobile units 110 may facilitate quickly and efficiently identifying mobile units 110 having different activity levels. For example, inactive or VACATE class mobile units 110 may be identified by their position near the bottom of the database 200. One or more lists of the inactive class mobile units 110 may also be maintained. For example, FIG. 2B conceptually illustrates one exemplary embodiment of a database 210 indicating mobile units 110 that have been classified as inactive or VACATE. The database 210 may be referred to as an ersatz database 210.

Referring back to FIG. 1, memory may be allocated to the mobile units 110 based upon their activity level or class. In one embodiment, the CPU 115 may allocate memory in the fast-access, resident memory 120 to active mobile units 110, such as the mobile unit 110(4). However, mobile units 110 having relatively low activity levels, such as the mobile unit 110(2), may be allocated memory in non-resident memory 130, which may be maintained in the base station router 105 or at another location. Although access to information stored in the non-resident memory 130 may be relatively slow compared to accessing information in the resident memory 120, the inactive mobile unit 110(2) may be unlikely to attempt to access this information and so allocating or "parking" memory associated with the inactive mobile unit 110(2) in the non-resident memory 130 may not impact the overall performance of the wireless communication system 100. Furthermore, parking memory associated with the inactive mobile unit 110(2) may free up valuable resources such as memory space in the relatively fast, resident memory 120. Parking may also be referred to as "swapping" memory to the non-resident memory 130.

Alternatively, the memory allocated to mobile units 110 having relatively low activity levels, such as the mobile unit 110(2), may be compressed. For example, a software algorithm running on the CPU 115 may compress the data buffer allocated to the mobile unit 110(2) and store the compressed data in another data buffer. The compressed data may be stored in the resident memory 120 or the non-resident memory 130. The original (uncompressed) data buffer may then be allocated to an active mobile unit 110. Although compressing and/or uncompressing the data may consume time and resources, the inactive mobile unit 110(3) may be unlikely to attempt to access this information and so allocating a compressed memory buffer to the inactive mobile unit 110(2) may result in a net savings of resources in the wireless communication system 100.

In the illustrated embodiment, the PARK and COMPRESS operations have been described as being distinct operations that may be applied to sessions 125 having differing activity levels. In particular, the PARK operation is applied to sessions 125 that are less active than the sessions 125 that may be associated with compressed memory. However, persons of ordinary skill in the art having benefit of the present disclosure should appreciate that the present invention is not limited to applying the PARK operation to less active sessions 125 and applying the COMPRESS operation to more active sessions 125. In alternative embodiments, the COMPRESS operation may be applied to less active sessions 125 and the PARK operation may be applied to more active sessions 125. Furthermore, some sessions 125 may be compressed and parked, i.e., a data buffer associated with a session 125 may be compressed and then the compressed data buffer may be stored on non-resident memory 130. The criteria for determining whether to park memory, compress memory, or utilize some combination of parking and compressing a memory are matters of design choice and the present invention is not limited to the particular criteria discussed herein.

The CPU 115 may determine the activity levels of the mobile units 110 by accessing the database stored in the memory 120. In one embodiment, the CPU 115 may access information in the database at predetermined times or in response to particular events or conditions, such as a rise or fall in the system load and/or total allocated memory in the memory 120. Memory may then be allocated to the mobile units 110 based upon the information in the database. This information may be regularly updated and so memory may be re-allocated to one or more the mobile units based upon changes in the information included in the database. For example, if the mobile unit 110(1) initiates a connection over the associated sessions 125(1), the mobile unit 110(1) may be reclassified as ACTIVE and memory in the resident memory 120 may be allocated to the mobile unit 110(1). Conversely, mobile units 110 that do not activate or use connections for a predetermined period of time may be reclassified as PARK or VACATE and may have their memory allocations parked in the non-resident memory 130. Sorting the entries in a database may also facilitate the parking techniques described herein. For example, a virtual memory manager has to have 8 kilobytes of contiguous idle memory to swap out between two memory locations. Session data for each session is typically 4 K long, so two adjacent sessions have to be idle or inactive for a virtual memory manager to park data by swapping the data to a different location. Thus, sorting the sessions so that sessions having similar activity levels are grouped together may facilitates more efficient swapping.

If the activity level of a parked or compressed session 125 changes, then the parked or compressed data associated with the session 125 may be swapped back into resident memory 120 (in the case of parked data) and/or uncompressed (in the case of compressed data). There may be a delay to the system 100 when this data is read back in from non-resident memory 130 and/or uncompressed. However, multi-threading the call processing application so that two or more instances of the call processing application that run in parallel may overcome this delay. Two multi-threaded applications normally split the available CPU time equally, but if one instance gets delayed waiting for the data from non-resident memory 130, the other instance can take up the unused CPU time.

The CPU 115 may also assign one or more of the mobile units 110 to the ersatz database if the mobile unit 110 is determined to rarely or never utilize a connection associated with the session. In one embodiment, the CPU 115 may evaluate session activity of the mobile units 110 whenever a session terminates and/or periodically during the life of the session. If the session had a sufficient duration but rarely or never established a connection, a hardware ID of the mobile unit 110 may be added to the ersatz database. If the session had sufficient duration and established connections, the hardware ID may be deleted from the ersatz database. Old sessions may also be periodically removed from the ersatz database. Thus, the ersatz database may be maintained to contain the hardware IDs of mobile units 110 that have recently registered with the system 100 but have rarely used the system 110 and thus are likely to be ersatz sessions.

The memory allocated to mobile units 110 listed in the ersatz database may be vacated from the resident memory 120 and the non-resident memory 130. The vacated memory may then be allocated to other mobile units 110 that have higher activity levels and are therefore more likely to make use of the allocated memory. The vacated mobile units 110 may also be assigned a bogus UATI that does not indicate a memory location associated with a session. In one embodiment, the bogus UATI encodes information indicative of the state or type of the session into its Session ID number or UATI032, as it is known in 1×EVDO. This may enable vacated mobile units 110 to be handed off between different base station routers 105 in different subnets, as will be discussed in detail below.

Figure 3:
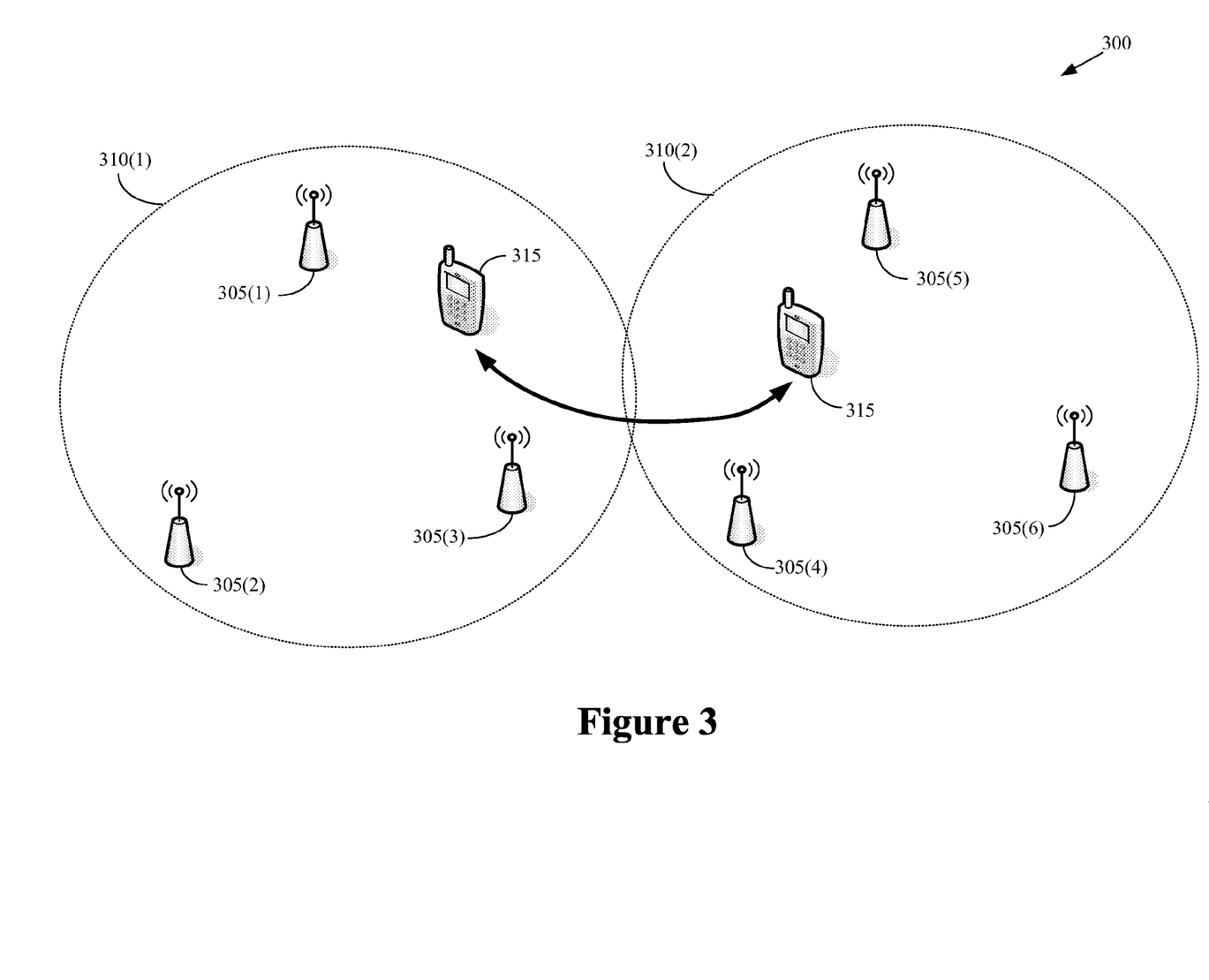
FIG. 3 conceptually illustrates a second exemplary embodiment of a distributed wireless communication system, in accordance with the present invention.

FIG. 3 conceptually illustrates a second exemplary embodiment of a wireless communication system 300. In the second exemplary embodiment, access points for the distributed wireless communication system 300 include a distributed network of base station routers 305. Subsets of the base station routers 305 are grouped into subnets 310. Each subnet 310 has a subnet address, such as a 104-bit UATI address, and may also have an 8-bit alias to the subnet address called a color code. In the interest of clarity, only two subnets 310 including six base station routers 305 have been depicted in FIG. 3. However, persons of ordinary skill in the art should appreciate that the present invention is not limited to this illustrative exemplary embodiment. In alternative embodiments, any desirable number of subnets 310 including any desirable number of base station routers 305 may be used.

The second exemplary embodiment of the wireless communication system 300 includes a mobile unit 315. If the mobile unit 315 is relatively active, then a conventional identifier such as a UATI formed of a UATI104 and a UATI024 may be assigned to the mobile unit 315. In one embodiment, 12 session bits in the UATI024 may represent up to 4096 sessions. The 12 base station router identifier bits may represent up to 4096 base station routers 305 within a subnet 310 or color code. Accordingly, as will be discussed in detail below, when the mobile unit 315 moves from a first (serving) base station 305 to a second (target) base station router 305 within the same subnet 310 or color code, the target base station router 305 may identify the serving base station router 305 using the UATI024 portion of the UATI. The target base station router 305 may then retrieve session information from the serving base station router 305 e.g., session information that may be stored in resident or nonresident memory. Similarly, the complete UATI may be used to identify the serving base station router 305 so that session information may be retrieved when the mobile unit 315 moves between subnets 310.

However, if memory associated with the mobile unit 315 has been vacated, then no session state information is associated with the vacated mobile unit 315 and none of the base station routers 305 has this information stored in memory. Furthermore, the UATI associated with the vacated mobile unit 315 may be a bogus UATI. Thus, when the mobile unit 315 hands off between two base station routers 305 in different subnets 310, the target base station router 305 may be configured to parse the bogus UATI to identify the session as a regular session or an ersatz sessions. The bogus UATI also includes information indicating a valid UATI Assignment sequence number to be used when assigning the next ersatz session number after an inter-subnet session transfer. The UATI sequence numbers are required by standards to be no more than 127 values larger than the current value known to the mobile unit 315, even if, as in the case of a vacated session, the system 300 has lost any record of the session including the valid sequence numbers. The target base station router 305 may therefore be able to determine that no memory has been allocated to the vacated session associated with the mobile unit 315 and to assign an appropriate sequence number to the session based on the bogus identifier.

Figure 4A:
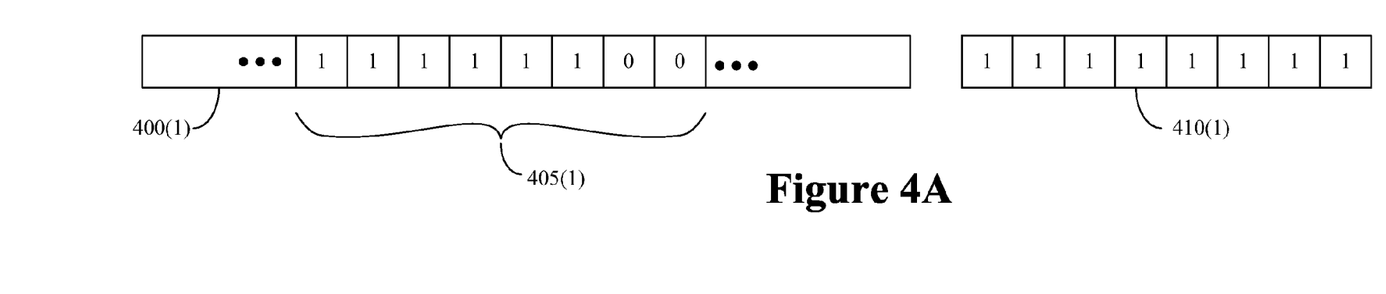
FIGS. 4A, 4B, and 4C conceptually illustrate three exemplary embodiments of bogus identifiers, in accordance with the present invention.
Figure 4B:
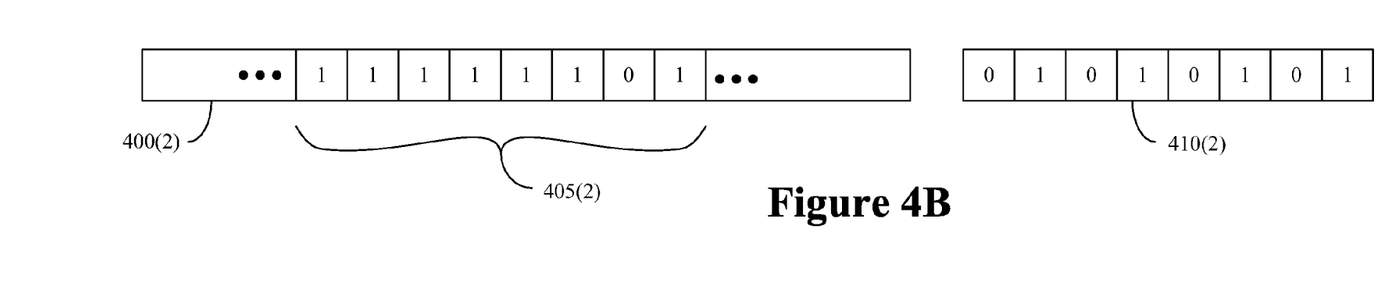
Figure 4C:
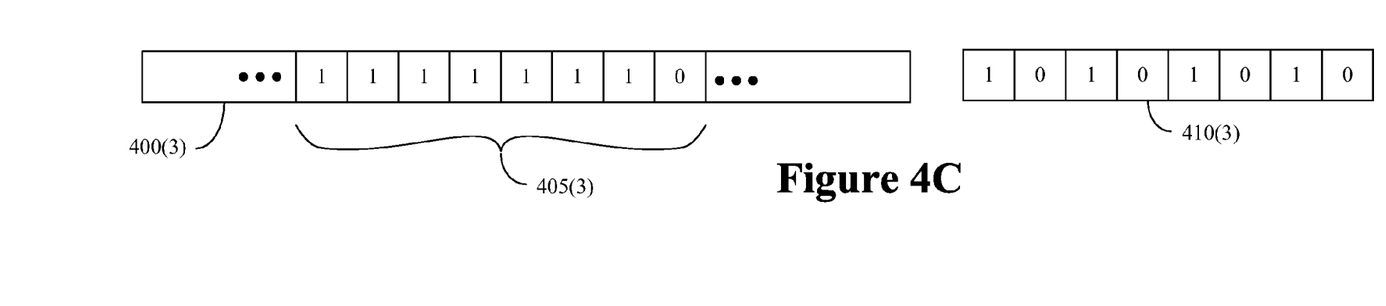

FIGS. 4A, 4B, and 4C conceptually illustrate three exemplary embodiments of bogus identifiers 400. In the illustrated embodiments, the bogus identifiers 400 include 32 bits to correspond to conventional UATI032 numbers. However, in alternative embodiments, the bogus identifiers 400 may include other numbers of bits, such as 128 bits to correspond to conventional UAIT128 numbers. The bogus identifiers 400 may also encode a color code 405 that may be identified by base station routers, e.g., when a session associated with a mobile unit requests an inter-subnet transfer from a serving base station router to a target base station router in a different subnet. The bogus identifiers 400 may also be associated with a sequence number 410, which may be selected to be interpreted as a valid sequence number by a target base station router following an inter-subnet transfer. In alternative embodiments, the sequence numbers 410 may be explicitly encoded in bits of the bogus identifier 400 or may be implicitly encoded in the bogus identifier 400, e.g., by a predetermined association between a color code 405 and a sequence number 410.

In the illustrated embodiment, three color codes may be reserved to define ersatz sessions and each of the three color codes may indicate which UATI Sequence number to use when assigning the next ersatz session to the mobile unit 315. In the illustrated embodiment, the three color codes have values of 252, 253 and 254 and the next valid UATI sequence numbers for the color codes are 85, 170 and 255, respectively. If a base station router receives a request for an incoming ersatz session with a color code 252 and a next valid sequence number 410 has a value of 255, as indicated by the color code 405(1) in the bogus UATI 400(1) and the sequence number 410(1), then the system would assign the session a new UATI 401(2) that encodes a color code 405(2) having a value of 253 and a UATI sequence number 410(2) having a value of 85. If an incoming ersatz session encodes a color code 405(2) having a value of 253 and a UATI sequence number 410(2) having a value of 85, the system would assign it a new UATI that encodes a new color code 405(3) having a value of 254 and a new UATI sequence number 410(3) having a value of 170. If an incoming ersatz session encodes a color code 405(3) having a value of 254 and a UATI sequence number 410(3) having a value of 170, the system would assign it a new bogus UATI that encodes a color code 405(1) having a value of 252 and a UATI sequence number 410(1) having a value of 255.

However, persons of ordinary skill in the art having benefit of the present disclosure should appreciate that other techniques for identifying and managing ersatz sessions may be used. For example, in one alternative embodiment, a standards-based technique may be employed in which a mobile unit may negotiate the capability to allow a single ersatz session color code, for which no UATI Assignment sequence number is checked, thus only requiring one color code to be used for ersatz sessions. Another alternative is to identify ersatz sessions based on two, as yet, unused (0) bits in the conventional UATI. These bits may be set to indicate whether the system has assigned an ersatz session to the associate session. If either of the two bits are set (b01, b10, b11), it would indicate an ersatz session. These bit patterns may also correspond to the value of the next valid UATI sequence number. This embodiment does not need to reserve the use of three color codes, but it may decrease the number of allowed sessions in a color code subnet by a factor of 4. For example, the maximum number of UATI sessions per base station router may be reduced from approximately 520 k to approximately 130 k.

Vacated sessions may also be identified by reserving one ersatz session color code and sending UATI Assignments associated with the ersatz session at least three times, each transmission having a different UATI assignment sequence number. This embodiment may be less desirable because the assignment is more likely to fail if the first one or two UATI assignment messages have the wrong sequence number and are ignored by the mobile unit. In one alternative embodiment, the mobile unit may only be required to receive one valid message out of three, which may increase the chance of correctly interpreting at least one message.

The techniques described herein for allocating resources based on activity levels of mobile units may have a number of advantages over conventional practice. For example, in contrast to conventional techniques that attempt to efficiently use mainline resources that are allocated to mobile units that rarely use the system, the techniques described herein may reduce or eliminate the need to expend mainline resources for users that have low activity levels and/or no connection. Both processing and memory usage associated with a low activity sessions may be curtailed. Moreover, by relegating inactive sessions to ersatz sessions that are not subtracted from the limited UATI session count, wireless communication systems that implement embodiments of the techniques described herein may be able to serve more actual users, thereby increasing effective system capacity.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method involving a mobile unit having at least one first session with a base station router, comprising:
   determining at least one first activity level associated with said at least one first session, said at least one first activity level associated with said at least one first session indicating an elapsed time since the mobile unit last used said at least one first session; and
   allocating memory to said at least one first session based on said at least one first activity level so that said at least one first session is allocated memory that can be accessed faster than memory allocated to at least one second session having at least one second activity level that is lower than said at least one first activity level.

2. The method of claim 1, wherein determining said at least one first activity level comprises determining said at least one activity level during the life of said at least one first session and when said at least one first session ends.

3. The method of claim 1, wherein determining said at least one first activity level associated with said at least one first session comprises:
   determining at least one duration of said at least one first session;
   determining whether at least one connection was established for said at least one first session; and
   determining durations of any connections established for said at least one first session.

4. The method of claim 3, wherein determining said at least one first activity level associated with said at least one first session comprises classifying said at least one first activity level of said at least one first session based on said at least one duration of said at least one first session, whether said at least one connection was established for said at least one first session, and the durations of any connections established for said at least one first session.

5. The method of claim 1, comprising forming a list comprising information identifying said at least one first session and said at least one first activity level.

6. The method of claim 5, comprising sorting the list based upon said at least one first activity level associated with said at least one first session.

7. The method of claim 5, wherein determining said at least one first activity level associated with said at least one first session comprises determining said at least one first activity level by accessing the list.

8. The method of claim 1, wherein allocating memory to said at least one first session comprises allocating fast-access resident memory in the base station router to said at least one first session when said at least one first activity level exceeds a first selected threshold.

9. The method of claim 8, wherein allocating memory to said at least one first session comprises allocating slow-access non-resident memory to said at least one first session when said at least one first activity level is below the first selected threshold.

10. The method of claim 9, wherein allocating memory to said at least one first session comprises changing the allocation in response to said at least one first activity level associated with said at least one first session changing.

11. The method of claim 8, wherein allocating memory to said at least one first session comprises allocating substantially no memory to said at least one first session when said at least one first activity level is below a second selected threshold.

12. The method of claim 11, comprising assigning a session identifier to said at least one first session, each session identifier comprising information indicative of the corresponding session.

13. The method of claim 12, wherein assigning the session identifier comprises assigning information indicative of at least one of a current color code, a current sequence number, a color code to be used following handover of each first session, and a valid sequence number to be used following handover of each first session.

14. The method of claim 12, wherein the assigning the session identifier comprises assigning information indicating that substantially no memory is to be allocated to said at least one first session indicated by the session identifier.

15. The method of claim 1, wherein allocating memory to said at least one first session comprises compressing memory allocated to first sessions that have lower activity levels than first sessions that are allocated uncompressed memory.

16. The method of claim 15, wherein allocating memory to said at least one first session comprises storing the compressed memory in non-resident memory.

17. The method of claim 1, wherein allocating memory to said at least one first session comprises allocating memory to said at least one first session based upon a determined system load.

18. The method of claim 1, comprising receiving a request to establish at least one connection associated with said at least one first session.

19. The method of claim 18, comprising establishing at least one second session associated with said at least one mobile unit.

20. The method of claim 19, comprising establishing the requested to connection using said at least one second session.

21. A method involving a mobile unit having at least one first session with a base station router, comprising:
    determining an at least one first activity level associated with the at least one first session, the at least one first activity level associated with the at least one first session indicating at least one elapsed time since the mobile unit last used the at least one first session, and wherein determining the at least one activity level associated with the at least one first session comprises:
    determining at least one duration of the at least one first session;
    determining whether at least one connection was established for the at least one first session; and
    determining durations of any connections established for the at least one first session; and
    allocating memory to the at least one first session so that the at least one first session is allocated memory that can be accessed faster than memory allocated to at least one second session having at least one second activity level that is lower than the at least one first activity level.

22. The method of claim 21, wherein determining the at least one activity level comprises determining the at least one activity level during the life of the at least one first session and when the at least one first session ends.

23. The method of claim 21, wherein determining the at least one activity level associated with the at least one first session comprises classifying the at least one activity level of the at least one first session based on the at least one duration of the at least one first session, whether said at least one connection was established for the at least one first session, and the durations of any connections established for the at least one first session.

24. The method of claim 21, wherein:
    allocating memory to the at least one first session comprises allocating fast-access resident memory in the base station router to the at least one first session when the at least one activity level exceeds a first selected threshold; and
    allocating memory to the at least one first session comprises allocating slow-access non-resident memory to the at least one first session when the at least one activity level is below the selected threshold.

25. The method of claim 21, wherein allocating memory to the at least one first session comprises compressing memory allocated to the at least one first session if the at least one activity level is below a threshold.

* * * * *